(12) United States Patent
Han et al.

(10) Patent No.: US 9,368,821 B2
(45) Date of Patent: Jun. 14, 2016

(54) COMPOSITE ELECTROLYTE MEMBRANE FOR FUEL CELL, METHOD FOR PRODUCING THE ELECTROLYTE MEMBRANE AND FUEL CELL INCLUDING THE ELECTROLYTE MEMBRANE

(75) Inventors: Haksoo Han, Seoul (KR); Minsu Jeong, Seoul (KR); Seung-Hyuk Choi, Seoul (KR)

(73) Assignee: Industry-Academic Cooperation Foundation Yonsei University, Seoul (KR)

( * ) Notice: Subject to any disclaimer, the term of this patent is extended or adjusted under 35 U.S.C. 154(b) by 376 days.

(21) Appl. No.: 13/877,398

(22) PCT Filed: Oct. 5, 2010

(86) PCT No.: PCT/KR2010/006794
§ 371 (c)(1),
(2), (4) Date: May 24, 2013

(87) PCT Pub. No.: WO2012/046889
PCT Pub. Date: Apr. 12, 2012

(65) Prior Publication Data
US 2013/0236798 A1    Sep. 12, 2013

(51) Int. Cl.
*H01M 8/10* (2006.01)
*C08J 5/22* (2006.01)
*H01B 1/12* (2006.01)

(52) U.S. Cl.
CPC ............ *H01M 8/1018* (2013.01); *C08J 5/2206* (2013.01); *C08J 5/2256* (2013.01); *H01B 1/127* (2013.01); *H01B 1/128* (2013.01); *H01M 8/103* (2013.01); *H01M 8/1048* (2013.01); *H01M 8/1058* (2013.01); *C08J 2379/06* (2013.01); *Y02E 60/521* (2013.01); *Y02P 20/149* (2015.11); *Y02P 70/56* (2015.11)

(58) Field of Classification Search
None
See application file for complete search history.

(56) References Cited

U.S. PATENT DOCUMENTS

| 6,733,828 | B2 * | 5/2004 | Chao | B01J 29/0308 427/230 |
| 7,488,520 | B2 * | 2/2009 | Urlaub | A61L 9/01 428/34.1 |
| 7,754,197 | B2 * | 7/2010 | Wu | A61L 9/014 424/600 |
| 2002/0169071 | A1 * | 11/2002 | Sauvage | B01J 31/0295 502/150 |
| 2004/0048129 | A1 | 3/2004 | Taft et al. | |
| 2004/0215013 | A1 * | 10/2004 | Sultana | B01J 21/08 540/534 |

(Continued)

FOREIGN PATENT DOCUMENTS

| EP | 1427044 A2 | 6/2004 |
| EP | 1796198 A2 | 6/2007 |

OTHER PUBLICATIONS

International Search Report for Application No. PCT/KR2010/006794, dated Jul. 26, 2011.

*Primary Examiner* — Scott J Chmielecki
(74) *Attorney, Agent, or Firm* — Alston & Bird LLP (57) ABSTRACT

Disclosed is a composite electrolyte membrane for a fuel cell. The composite electrolyte membrane includes a polybenzimidazole-based polymer and a metal-grafted porous structure. The composite electrolyte membrane is doped with phosphoric acid. The metal-containing porous structure is present in an amount of 0.1 to 30% by weight, based on the weight of the polymer. The presence of the metal-containing porous structure allows the fuel cell electrolyte membrane to have excellent thermal properties and high proton conductivity.

12 Claims, 8 Drawing Sheets

(56) References Cited

U.S. PATENT DOCUMENTS

| | | | |
|---|---|---|---|
| 2005/0040080 A1* | 2/2005 | Riley | B01J 23/85 208/216 R |
| 2006/0148953 A1 | 7/2006 | Hong et al. | |
| 2007/0128490 A1* | 6/2007 | Li | B01D 67/009 521/25 |
| 2007/0191499 A1 | 8/2007 | Chmelka et al. | |
| 2007/0244000 A1* | 10/2007 | Molinier | B01J 23/80 502/300 |
| 2008/0050633 A1* | 2/2008 | Kwon | H01M 4/921 429/483 |
| 2008/0070094 A1* | 3/2008 | Park | H01M 4/92 429/480 |
| 2008/0264254 A1* | 10/2008 | Song | B01D 53/02 95/116 |
| 2010/0089238 A1* | 4/2010 | Miachon | B01D 53/025 95/203 |
| 2011/0082222 A1* | 4/2011 | Ziser | H01M 8/1025 521/38 |
| 2011/0091789 A1* | 4/2011 | Mofakhami | C25B 1/02 429/482 |
| 2012/0273366 A1* | 11/2012 | Magalhaes Mendes | B01J 19/2475 205/637 |
| 2012/0276468 A1* | 11/2012 | Attidekou | B01D 67/0048 429/465 |

* cited by examiner

COMPOSITE ELECTROLYTE MEMBRANE FOR FUEL CELL, METHOD FOR PRODUCING THE ELECTROLYTE MEMBRANE AND FUEL CELL INCLUDING THE ELECTROLYTE MEMBRANE

CROSS-REFERENCE TO RELATED APPLICATIONS

This application is a national stage application filed under 35 U.S.C. 371 of International Application No. PCT/KR2010/006794, filed Oct. 5, 2010, which is incorporated by reference herein in its entirety.

BACKGROUND OF THE INVENTION

1. Field of the Invention

The present invention relates to a composite electrolyte membrane for a fuel cell. More specifically, the present invention relates to a composite electrolyte membrane for a fuel cell with good thermal stability and high ionic conductivity, a method for producing the composite electrolyte membrane, and a fuel cell including the composite electrolyte membrane.

2. Description of the Related Art

Fuel cells are energy conversion devices that directly convert chemical energy of fuel into electrical energy. Considerable research efforts have been made to develop fuel cells as next-generation energy sources on account of their high energy conversion efficiency and eco-friendly nature with low pollutant emission.

Particularly, polymer electrolyte membrane fuel cells (PEMFCs) operate at low temperatures, undergo no leakage by the use of solid electrolytes, and are driven at high speeds. Due to these advantages, PEMFCs have received a great deal of attention as power supplies in portable, automotive and household applications. In comparison with other types of fuel cells, PEMFCs generate high power with high current density, are simple in structure, and have fast start-up and response characteristics. PEMFCs can use methanol or natural gas as a fuel as well as hydrogen, and are highly durable. Moreover, PEMFCs can be reduced in size due to their high power density. For these reasons, PEMFCs are increasingly being investigated as portable fuel cells.

Dow, Nafion (DuPont), Flemion (Asahi Glass), and Aciplex (Asahi Kasei) are currently in use as solid polymer electrolyte membranes. Generally, such solid polymer electrolyte membranes use perfluorosulfonic acid polymer membranes that have a fluorinated alkylene groups in the main chain and terminal sulfonic acid groups in the fluorinated vinyl ether side chains (e.g., Nafion (DuPont)). Fluorinated polymer electrolyte membranes have good chemical stability and high hydrogen ion conductivity, but complicated fluorination processes entail considerable production costs, limiting their application to fuel cells for automobiles. Since fluorinated polymer electrolyte membranes have low water contents, it is necessary to operate cells at temperatures of 100° C. or higher in order to prevent catalyst poisoning. In this case, evaporation of water from the fluorinated polymer electrolyte membranes causes a marked reduction in ionic conductivity and stops the operation of the cells. Fluorinated polymer electrolyte membranes have low glass transition temperatures, which are responsible for their poor mechanical properties at high temperatures.

In attempts to overcome the above disadvantages, proton conducting polymer membranes have been developed in which a basic polymer, such as polybenzimidazole (PBI), poly(2,5-benzimidazole) or poly(2,6-benzimidazole), is doped with a strong acid, such as phosphoric acid. In a state in which no water is included, the acid imparts the proton conducting polymer membranes with conductivity by the Grotthus mechanism.

Polybenzimidazole and poly(2,5-benzimidazole) are less expensive than Nafion and have the ability to conduct protons at temperatures of 100° C. or higher without humidification. A trace amount of carbon monoxide inevitably remains in hydrogen produced from natural gas, gasoline or methanol. Carbon monoxide of a few ppm or more is adsorbed to the surface of platinum catalyst and impedes the oxidation of fuel at the surface, bringing about a marked reduction in fuel cell performance. When a fuel cell operates at a temperature of 120° C. or higher, platinum catalyst poisoning caused by carbon monoxide is greatly reduced because adsorption of carbon monoxide to the platinum catalyst is an exothermic reaction. In addition, the oxidation/reduction rate of the fuel cell can be increased, advantageously resulting in high cell efficiency.

For example, a reformer may be used in a fuel cell. In this case, heat may be released from the system. In the case where the fuel cell is designed to operate at a temperature of 100° C. or less, an additional cooling device is required to remove heat released from the system in order to prevent overheating of the system. In contrast, in the case where the fuel cell is designed to operate at a high temperature, such heat can be used for operation, thus avoiding the need for any additional cooling device.

Despite the above advantages, a fuel cell system using a basic polymer, such as PBI or ABPBI, has a fatal drawback in that an acid, for example, phosphoric acid, which is not permanently bonded to the basic polymer but is present merely as an electrolyte, may be dissolved from the polymer membrane due to the presence of water. Particularly, when a fuel cell operates at a temperature exceeding 100° C., a large portion of water as a reaction product formed at the cathode of the fuel cell escapes in the form of vapor through a gas diffusion electrode, causing less loss of phosphoric acid. However, a large quantity of water may be generated in some zones where the operating temperature is lower than 100° C. or the current density is high. Since the water is not immediately removed, it dissolves phosphoric acid, which shortens the cell life.

The mechanical properties of ABPBI deteriorate as the concentration of phosphoric acid increases. The polymer membrane is dissolved in phosphoric acid at a concentration of 80%. As a result, the power of the fuel cell markedly deteriorates with increasing number of cycles.

There is thus a need to develop electrolyte membranes that have good thermal and mechanical stability and can operate even at high temperatures.

SUMMARY OF THE INVENTION

It is a first object of the present invention to provide a composite electrolyte membrane for a fuel cell that has good thermal stability and high ionic conductivity.

It is a second object of the present invention to provide a method for producing the composite electrolyte membrane.

It is a third object of the present invention to provide a fuel cell including the composite electrolyte membrane.

According to the present invention, the first object is achieved by the provision of a composite electrolyte membrane for a fuel cell which includes a polybenzimidazole-based polymer and a metal-grafted porous structure and is doped with phosphoric acid wherein the metal-grafted porous structure is present in an amount of 0.1 to 30% by weight, based on the weight of the polymer.

In one embodiment of the present invention, the polybenzimidazole-based polymer is preferably selected from the group consisting of polybenzimidazole (PBI), poly(2,5-benzimidazole) (2,5-PBI), poly(2,6-benzimidazole) (2,6-PBI), and ABPBI.

In a further embodiment of the present invention, the metal is preferably selected from the group consisting of aluminum, copper, iron, nickel, and combinations thereof.

In a further embodiment of the present invention, the metal-grafted porous structure is preferably Al-MCM-41.

In a further embodiment of the present invention, the metal-containing porous structure preferably has a size of 900 nm or less.

According to the present invention, the second object is achieved by the provision of a method for producing a composite electrolyte membrane for a fuel cell, including: forming a metal-grafted porous structure; mixing the metal-grafted porous structure with a polymer solution to form a composite membrane; and doping the composite membrane with phosphoric acid to impart ionic conductivity thereto.

In one embodiment of the present invention, the formation of the metal-grafted porous structure may include: adding a metal chloride to an aqueous solution of an alkyltrimethylammonium halide; adding aqueous ammonia to the mixture, followed by stirring; dropwise adding tetraethyl orthosilicate to the resulting mixture, followed by stirring; and washing the reaction mixture, followed by drying and calcination to obtain a powder.

In a further embodiment of the present invention, the alkyltrimethylammonium halide is preferably selected from the group consisting of hexadecyltrimethylammonium bromide, dedecyltrimethylammonium bromide, tetradecyltrimethylammonium bromide, octadecyltrimethylammonium bromide, cetyltrimethylammonium chloride, myristyltrimethylammonium chloride, decyltrimethylammonium bromide, octyltrimethylammonium bromide, hexyltrimethylammonium bromide, and mixtures thereof.

In one embodiment of the present invention, the polymer may be selected from the group consisting of polybenzimidazole (PBI), poly(2,5-benzimidazole) (2,5-PBI), poly(2,6-benzimidazole) (2,6-PBI), and ABPBI.

In a further embodiment of the present invention, the metal is preferably selected from the group consisting of aluminum, copper, iron, nickel, and combinations thereof.

The metal-grafted porous structure is preferably Al-MCM-41.

In a further embodiment of the present invention, the metal-containing porous structure preferably has a size of 900 nm or less.

In a further embodiment of the present invention, the metal chloride is preferably added in an amount such that the metal ions are present at a level of 1 to 30 mole % relative to the total moles of the solution, and the metal-grafted porous structure is preferably present in an amount of 0.1 to 30% by weight relative to the weight of the polybenzimidazole-based polymer.

In a further embodiment of the present invention, the calcination is preferably carried out at a temperature in the range of 300 to 800° C.

According to the present invention, the third object is achieved by the provision of a fuel cell employing the composite electrolyte membrane.

The thermal properties of the electrolyte membrane are improved by the introduction of the metal-containing porous structure into the polymer. In addition, the proton conductivity of the composite electrolyte membrane can be remarkably improved by doping with phosphoric acid. Furthermore, the metal effectively prevents the doped acid from leakage. Due to these advantageous effects, high performance of the electrolyte membrane can be ensured.

BRIEF DESCRIPTION OF THE DRAWINGS

These and/or other aspects and advantages of the invention will become apparent and more readily appreciated from the following description of the embodiments, taken in conjunction with the accompanying drawings of which.

| | Monomer A | Monomer B | Polymer |
|---|---|---|---|
| PBI 2,5-PBI 2,6-PBI |  |    |    |
| ABPBI | |  |  | in a predetermined ratio was added to the dispersion. The mixture was cast to produce the composite membrane. Casting is a preferred technique in that blending and uniformity of the composite can be greatly improved.

DETAILED DESCRIPTION OF THE INVENTION

The present invention provides a composite electrolyte membrane for a fuel cell which includes a polybenzimidazole-based polymer and a metal-grafted porous structure and is doped with phosphoric acid wherein the metal-grafted porous structure is present in an amount of 0.1 to 30% by weight, based on the weight of the polymer. If the porous structure is present in an amount of less than 0.1% by weight, the effect of adding the porous structure is negligible. Meanwhile, the presence of the porous structure in an amount exceeding 30% by weight may increase the risk that the electrolyte membrane tends to be brittle.

The introduction of the porous structure can effectively increase the surface area of the electrolyte membrane, contributing to an increase in the amount of phosphoric acid doped. The increased amount of the acid leads to an increase in proton conductivity.

In one embodiment, the polymer is preferably selected from the group consisting of polybenzimidazole (PBI), poly (2,5-benzimidazole) (2,5-PBI), poly(2,6-benzimidazole) (2,6-PBI), and ABPBI. The polybenzimidazole-based polymer has a high glass transition temperature. Therefore, the polybenzimidazole-based polymer can be used at high temperature and is useful in achieving good thermal and mechanical stability of the membrane. In the acid/polymer system, the polymer is sufficiently basic to dissolve and complex with the acid. That is, the polymer acts as a matrix to retain the excess acid. On the other hand, the polymer is needed to obtain a high conductivity. The structures and constituent monomers of polybenzimidazole-based polymers In a further embodiment, the metal contained in the porous structure is preferably selected from the group consisting of aluminum, copper, iron, nickel, and combinations thereof. The affinity of the metal for the acid effectively reduces leakage of the acid doped into the electrolyte membrane with the passage of time.

In a further embodiment, the metal-containing porous structure preferably has a size of 900 nm or less. If the metal-containing porous structure is larger than 900 nm, the dispersibility of the porous structure in the polymer deteriorates. The pores of the porous structure are preferably close to spherical in shape. The spherical pores can maximize the surface area of the porous structure and can increase the content of phosphoric acid despite the small sizes thereof.

Molecular sieves generally refer to porous materials in which uniformly sized pores are uniformly arranged. MCM-41, a mobile crystalline material (MCM) developed by MOBIL, U.S.A., has a structure in which straight pores having a constant size form uniform channels in a hexagonal arrangement, like a honeycomb, on a silica plate. Recent research results have revealed that MCM-41 is produced through a liquid crystal template pathway. Specifically, MCM-41 can be obtained by the following procedure. First, a liquid crystalline structure of a surfactant is formed in an aqueous solution. Then, a hydrothermal reaction between the surfactant and surrounding silicate ions is allowed to occur. As a result of the reaction, conjugates of the surfactant and MCM-41 are formed. The conjugates are subjected to calcination at a temperature of 500 to 600° C. to remove the surfactant, leaving MCM-41 behind. The pore size of MCM-41 may be varied in the range of 1.6 to 10 nm by changing the production conditions, for example, by changing the kind of the surfactant or adding other organic materials. The reason why MCM-41 is most preferred is that MCM-41 has a porosity as high as about 80% and the phosphoric acid content can thus be increased. The composite electrolyte membrane of the present invention is characterized by the use of the metal-grafted porous structure, which is formed by adding a metal chloride to a porous structure, such as MCM-41. Phosphoric acid may be impregnated into pores of porous silica, zeolite or an MCM (e.g., MCM-41), but the problem of dissolution still remains. In contrast, interaction between the metal atoms grafted into the inner walls of the pores of the metal-grafted porous structure and phosphoric acid can greatly reduce dissolution of the phosphoric acid, leading to a considerable improvement in the proton conductivity of the composite electrolyte membrane.

Al-grafted MCM-41 (hereinafter, referred to as Al-MCM-41) may be exemplified as the metal-grafted porous structure. The term "Al-grafted" means that Al is intercalated and bonded between the silicon and oxygen atoms of the porous structure. In MCM-41, the walls of uniform hexagonal channels are composed of silica ($SiO_2$). Therefore, Al-MCM-41 is clearly different from MCM-41 in terms of chemical structure thereof.

The present invention also provides a method for producing a composite electrolyte membrane for a fuel cell, including forming a metal-grafted porous structure; mixing the metal-grafted porous structure with a polymer solution to form a composite membrane; and doping the composite membrane with phosphoric acid to impart ionic conductivity thereto.

The metal-grafted porous structure is formed by sol-gel processing using an alkyltrimethylammonium halide as a surfactant, a metal chloride, tetraethyl orthosilicate, etc.

Specifically, the formation of the metal-grafted porous structure may include: adding a metal chloride to an aqueous solution of an alkyltrimethylammonium halide; adding aqueous ammonia to the mixture, followed by stirring; dropwise adding tetraethyl orthosilicate to the resulting mixture, followed by stirring; and washing the reaction mixture, followed by drying and calcination to obtain a powder.

Examples of alkyltrimethylammonium halides suitable for use in the formation of the metal-grafted porous structure include hexadecyltrimethylammonium bromide, dedecyltrimethylammonium bromide, tetradecyltrimethylammonium bromide, octadecyltrimethylammonium bromide, cetyltrimethylammonium chloride, myristyltrimethylammonium chloride, decyltrimethylammonium bromide, octyltrimethylammonium bromide, and hexyltrimethylammonium bromide. These alkyltrimethylammonium halides may be used alone or as a mixture thereof.

The metal capable of being grafted into the metal-grafted porous structure is derived from a metal compound that can exist in the form of a metal ion when hydrated. The metal compound may be a metal chloride, for example, aluminum chloride, copper chloride, nickel chloride or iron chloride. The metal chloride is preferably added in an amount such that the metal ions are present at a level of 1 to 30 mole % relative to the total moles of the solution. If the metal ions are present in an amount of less than 1 mole %, the amount of the grafted metal is too small to sufficiently retain phosphoric acid. Meanwhile, if the metal ions are present in an amount exceeding 30 mole %, there is the risk that the metal may not be completely grafted into the porous structure or may cause collapse of the porous structure.

The calcination is preferably carried out at a temperature in the range of 300 to 800° C.

Doping with phosphoric acid is carried out to improve the conductivity of the polybenzimidazole-based electrolyte membrane. Phosphoric acid has the ability to form a three-dimensional hydrogen bonding network and can serve as a good proton conducting medium. Pure phosphoric acid has a conductivity of 0.53 S/cm at 30° C. This high value is known to come from the extensive self-ionization of phosphoric acid.

At high temperatures, phosphoric acid undergoes an auto-dehydration process in addition to the self-dissociation process. The dehydration is reversible at low temperature if water is provided. Accordingly, phosphoric acid can conduct protons at high temperature with low relative humidity by forming a polyphosphoric acid network. The proton conductivity of the benzimidazole type polyimide electrolyte membrane can be increased by doping with phosphoric acid, which tends to form salts with the base sites of the polymer.

Therefore, the composite electrolyte membrane produced by the method of the present invention can be employed to fabricate a fuel cell with improved performance.

The present invention will be explained in more detail with reference to the following examples. However, it will be appreciated by those skilled in the art that these examples are provided for illustrative purposes and are not intended to limit the scope of the invention.

EXAMPLES

Example 1

Example 1-(1)

Preparation of 2,5-polybenzimidazole (2,5-PBI)

100 g of polyphosphoric acid (PPA) was placed in a three-neck flask equipped with a reflux condenser, and 0.01 mol of 3.3-diaminobenzidine and 0.01 mol of 2,5-pyridinecarboxylic acid were added thereto. The mixture was slowly heated to 220° C. under a nitrogen atmosphere using the reflux condenser. The mixture was allowed to react for 30 hr. The reaction mixture was poured into deionized water, and filtered. The precipitate was titrated with a 1 M KOH solution, washed with deionized water, filtered, and dried, affording the title product in a yield of 63%.

Example 1-(2)

Formation of Metal-Grafted Porous Structure

Figure 4:
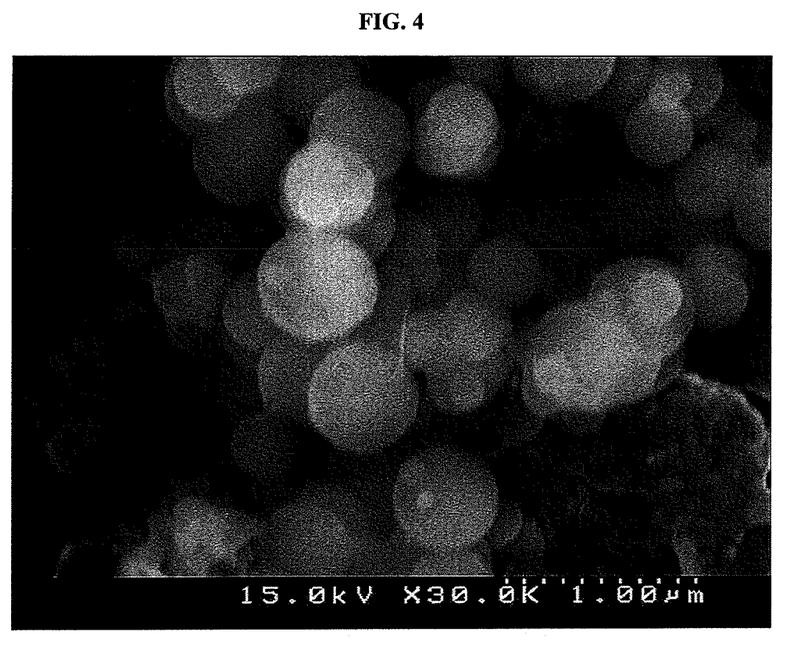
FIG. 4 is a SEM image showing a porous structure (Al-MCM-41) of a composite electrolyte membrane according to the present invention.
Figure 5:
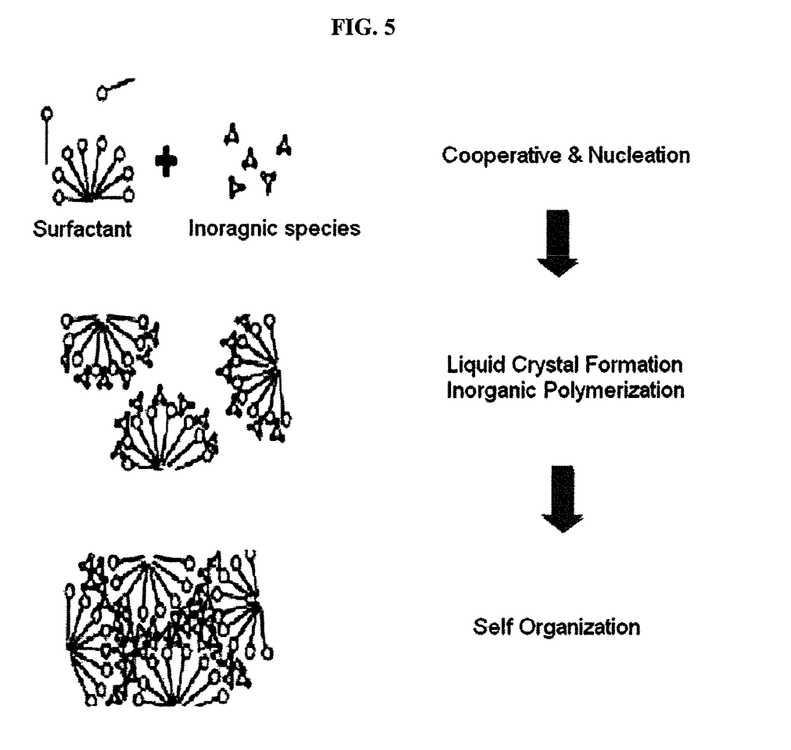
FIG. 5 is a diagram schematically showing a procedure for the formation of a porous structure in accordance with a method of the present invention.
Figure 6:
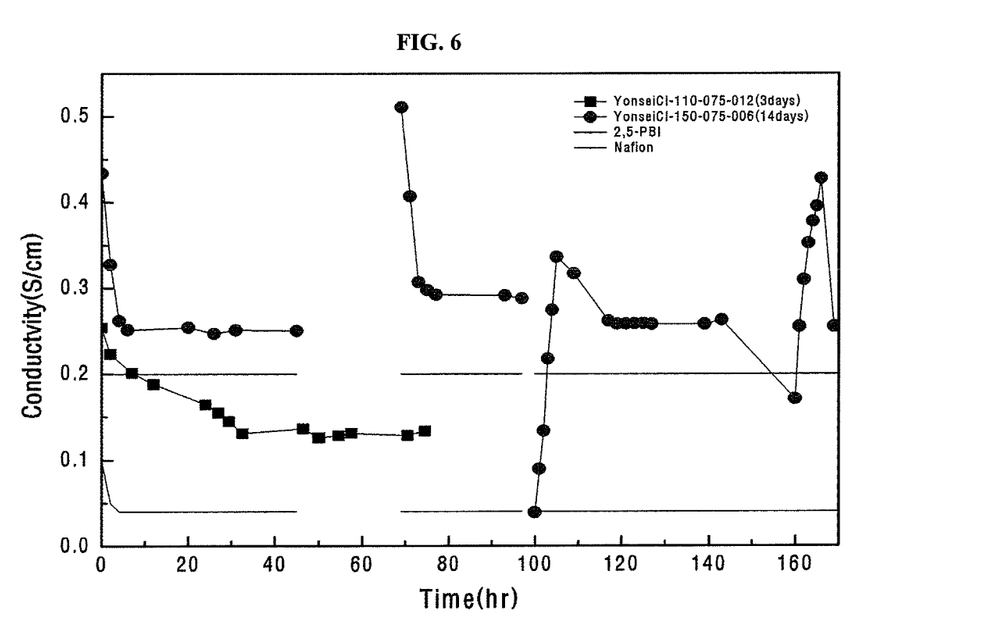
FIG. 6 is a graph showing the conductivities of electrolyte membranes including a commercially available Celanese membrane and an aluminum-grafted porous structure according to embodiments of the present invention as a function of time: herein, Yonsei Cl-110-075-012 and Yonsei Cl-150-075-006 are composite membranes of Celanese and Al-MCM-41. Yonsei Cl-110-075-012 and Yonsei Cl-150-075-006 have thicknesses of 110 μm and 150 μm, respectively, and include Al-MCM-41 in amounts of 12% and 6% by weight, respectively, based on the total weight thereof. Each of the numbers (3 and 14 days) in the parentheses indicates the time taken for phosphoric acid doping. 2,5-PBI and Nafion are non-composite membranes. It can be confirmed that the operating performance of the electrolyte membranes was maintained at high levels even after switches were turned on/off and despite varying operating temperatures.
Figure 7:
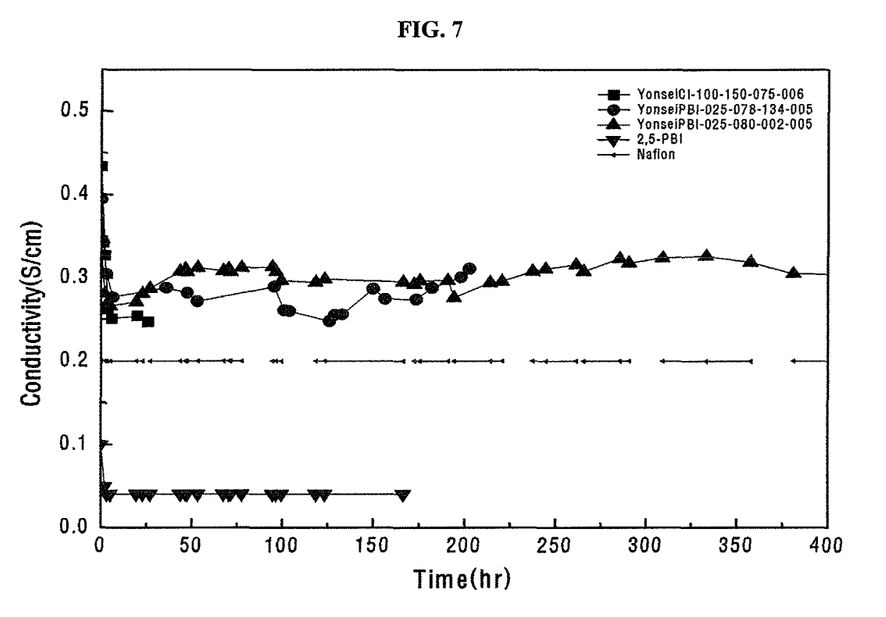
FIG. 7 is a graph showing the conductivities of electrolyte membranes including a 2,5-PBI membrane and an aluminum-grafted porous structure according to embodiments of the present invention as a function of time: herein, Yonsei PBI-025-078-134-005 and Yonsei PBI-025-080-002-005 are composite membranes of 2,5-PBI and Al-MCM-41. Yonsei PBI-025-078-134-005 and Yonsei PBI-025-080-002-005 they have thicknesses of 110 μm and 150 μm, respectively, and include Al-MCM-41 in an amount of 5% relative to the total weight thereof. 2,5-PBI and Nafion are non-composite membranes.
Figure 8:
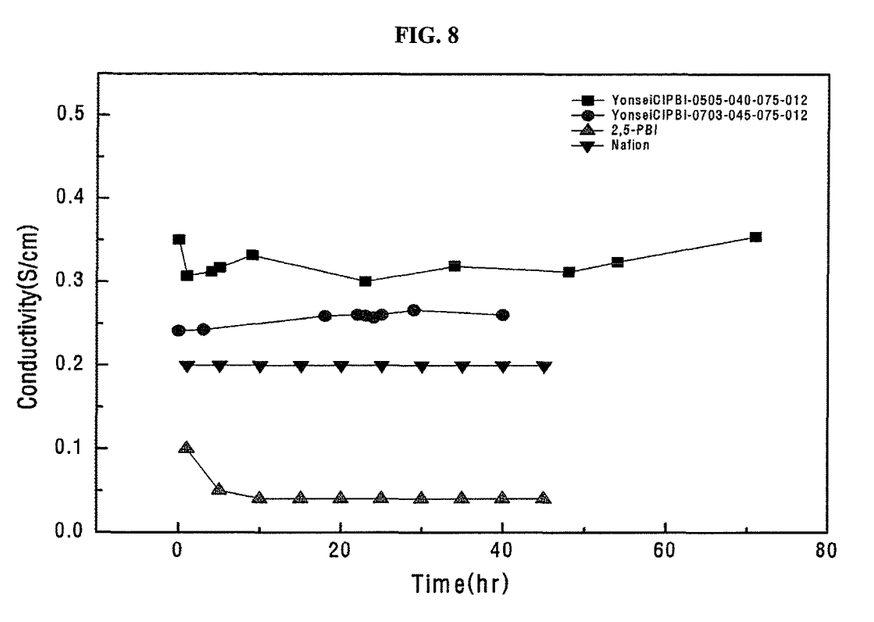
FIG. 8 is a graph showing the conductivities of electrolyte membranes including a Celanese/2,5-PBI membrane blend and an aluminum-grafted porous structure according to embodiments of the present invention as a function of time: herein, Yonsei ClPBI-0505-040-075-012 and Yonsei ClPBI-0703-045-075-012 are composite membranes of Celanese/2,5-PBI blend and Al-MCM-41 wherein the blending ratios of Celanese to 2,5-PBI are 5:5 and 7:3, respectively. Yonsei ClPBI-0505-040-075-012 and Yonsei ClPBI-0703-045-075-012 have thicknesses of 40 μm and 45 μm, respectively, and include Al-MCM-41 in an amount of 12% by weight relative to the total weight thereof. 2,5-PBI and Nafion are non-composite membranes. Each of the composite membrane was produced from the Celanese/2,5-PBI blend and Al-MCM-41 by the following procedure. First, the porous material was dispersed in methanesulfonic acid by sonication. A predetermined amount of a powder mixture of Celanese and 2,5-PBI suitable for use in the present invention are shown in the following table.

First, 2.5 g of hexadecyltrimethylammonium bromide was dissolved in a mixture of 90 g of water and 60 g of ethanol. To the mixture was added 1 g of aluminum chloride as a metal ion source. Then, 16.9 g of 25 wt % aqueous ammonia was added. The mixture was stirred for about 1 min. Thereafter, 4.7 g of tetraethyl orthosilicate (TEOS) was slowly added dropwise. After completion of the dropwise addition, stirring was further continued for about 2 hr. The reaction mixture was washed 3-4 times with water and dried under vacuum at 60° C. to obtain a powder. The powder was heated at a rate of 2° C./min and calcined at 540° C. to remove the template, giving Al-MCM-41 as a metal-grafted porous structure. A SEM image of Al-MCM-41 is shown in FIG. 4. A procedure for the formation of the porous structure is schematically shown in FIG. 5.

Example 1-(3)

Production of Composite Membranes as Mixtures of the Metal-Grafted Porous Structure and the Polymer 2,5-Polybenzimidazole prepared in Example 1-(1) was dissolved in methanesulfonic acid. To the polymer solution were added different amounts (1 wt %, 3 wt %, and 5 wt %) of the metal-grafted porous structure Al-MCM-41 prepared in Example 1-(2). The mixtures were homogenized by sonication. After sufficient stirring, the mixtures in the form of viscous solutions were spin coated on different glass plates, followed by curing at 80° C. for 1 hr, 100° C. for 1 hr, 120° C. for 1 hr, and 160° C. for 2 hr. After dipping in deionized water for 10 min, the membranes in the form of films were peeled from the glass plates.

Example 1-(4)

Doping of the Composite Membranes with Phosphoric Acid

For doping with phosphoric acid, the composite membranes produced in Example 1-(3) were dipped in an aqueous solution of phosphoric acid for a time (usually about 72 hr) sufficient to be impregnated with the phosphoric acid. As a result of the doping, ionic conductivity was imparted to the composite membranes. The phosphoric acid solution had a concentration of 85 wt %.

Comparative Example 1

A phosphoric acid doped electrolyte membrane was produced in the same manner as in Example 1, except that 2,5-PBI alone was used without using the porous structure.

Comparative Example 2

A phosphoric acid doped electrolyte membrane was produced in the same manner as in Example 1, except that MCM-41 was used instead of the metal-grafted porous structure.

Experimental Example 1

Thermal Stability Measurement Results

The thermal stability of the 2,5-PBI membrane containing the inorganic porous structure (Example 1) was evaluated using a thermogravimetric analyzer (Q-50, TA instrument) at a heating rate of 10° C./min in a $N_2$ environment. The results are shown in FIG. 1.

Figure 1:
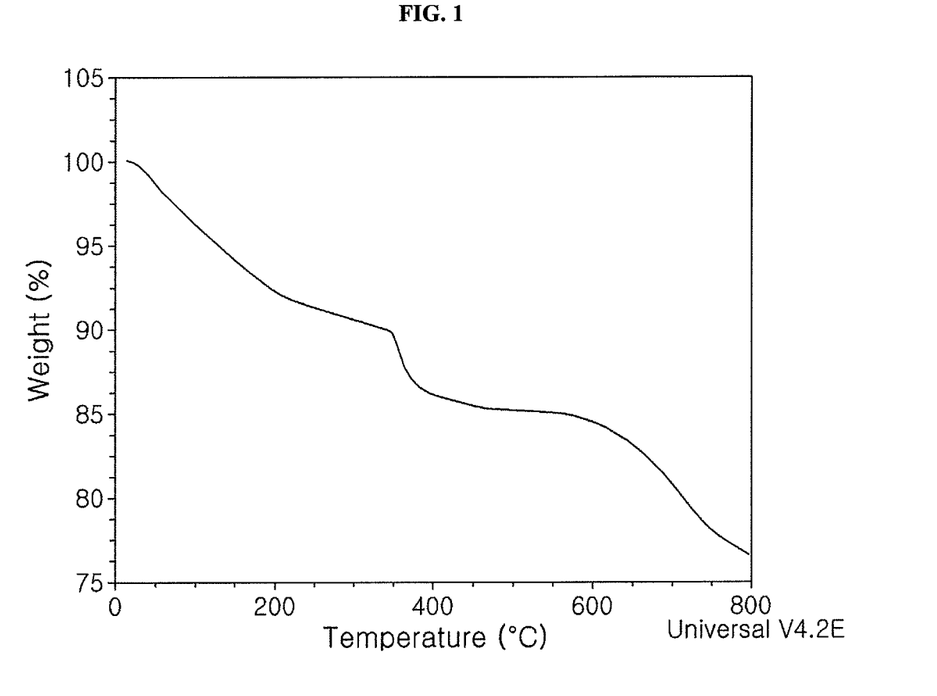
FIG. 1 is a graph showing the thermal stability of a composite electrolyte membrane for a fuel cell according to the present invention.

FIG. 1 confirms that the 2,5-PBI membrane of Example 1 showed high thermal stability (weight loss <10%) in the temperature range up to 350° C.

Experimental Example 2

Proton Conductivity Measurement Results

The efficiency of a fuel cell can be expressed as a power voltage depending on the charge density of the fuel cell, which depends on proton conductivity. Therefore, polymers with high proton conductivity are very suitable for use in PEMFC.

Proton conductivity was measured using an electrochemical impedance spectroscopy technique in the frequency range of 100 kHz to 10 Hz. The resistances of the inorganic acid-doped polybenzimidazole membranes were measured using an Autolab impedance analyzer and a proton conductivity cell. Proton conductivity ($\sigma$) was determined by Equation 1:

$$\sigma(S/cm) = \frac{d}{L_s W_s R} \quad (1)$$

where d, Ls, Ws and R are the distance between the electrodes, film thickness, film width and the resistance of the polybenzimidazole membrane, respectively.

Table 1 shows the proton conductivities of the composite electrolyte membrane of Example 1, in which the polybenzimidazole including the inorganic porous structure was doped with the acid, and the phosphoric acid doped electrolyte membrane of Comparative Example 1.

TABLE 1

| | Proton conductivity (S/cm) | | | | | |
|---|---|---|---|---|---|---|
| | 70 | 80 | 90 | 100 | 110 | 130 |
| Example 1 (2,5-PBI + Al-MCM-41 5 wt %) | 0.231 | 0.264 | 0.311 | 0.312 | 0.331 | 0.399 |
| Comparative Example 1 (2,5-PBI) | 0.0004 | 0.0006 | 0.0007 | 0.0009 | 0.001 | 0.002 |

Figure 2:
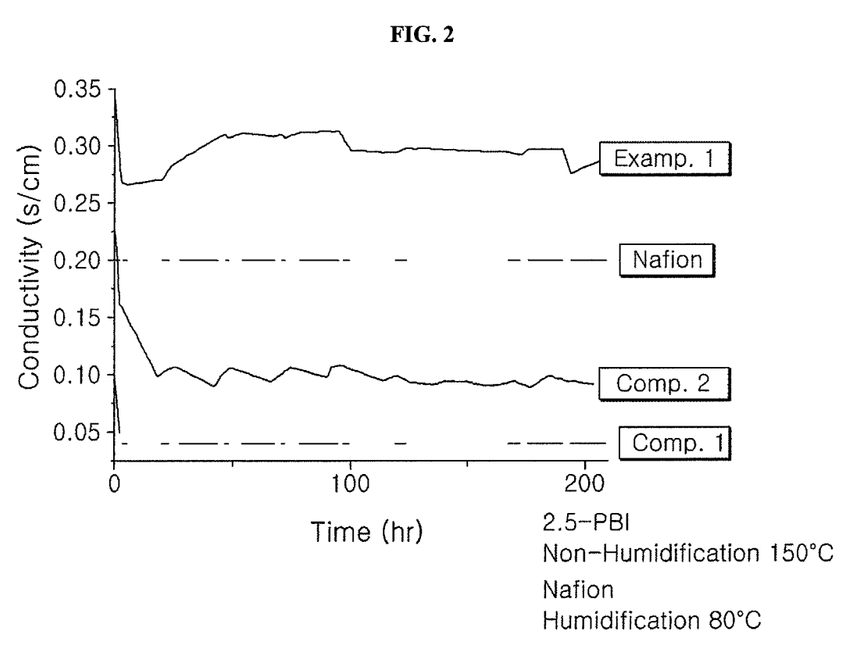
FIG. 2 is a graph showing the proton conductivities of the composite electrolyte membranes produced in Example 1 and Comparative Examples 1-2, and Nafion.

FIG. 2 is a graph showing the proton conductivities of the electrolyte membranes produced in Example 1 and Comparative Examples 1-2, and Nafion. Referring to FIG. 2, the proton conductivities of the electrolyte membrane with 5% Al-MCM-41 (Example 1) were about 200 times, about three times and about 1.5 times higher at high temperatures than those of the simple 2,5-polybenzimidazole electrolyte membrane (Comparative Example 1), the electrolyte membrane with MCM-41 (Comparative Example 2) and the commercially available electrolyte membrane Nafion, respectively, demonstrating that the electrolyte membrane of Example 1 is excellent in terms of proton conductivity.

Figure 3:
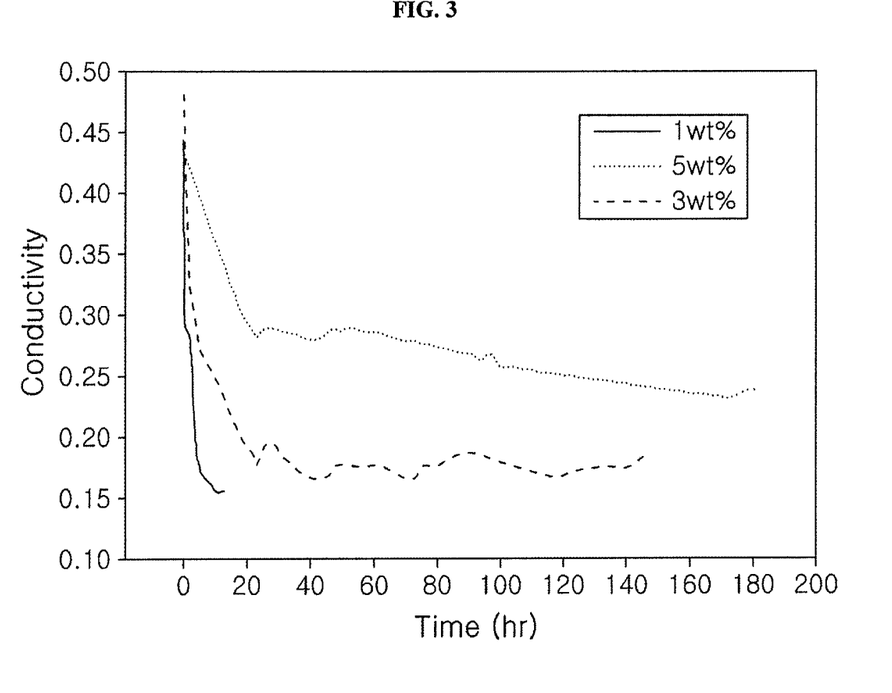
FIG. 3 is a graph showing the proton conductivities of electrolyte membranes with varying amounts (1%, 3%, and 5%) of Al-MCM-41.

FIG. 3 is a graph showing the proton conductivities of the electrolyte membranes with varying amounts of Al-MCM-41 (1%, 3%, and 5%). As can be seen from the graph, the proton conductivity of the electrolyte membrane increased with increasing amount of the metal-grafted porous structure.

What is claimed is:

1. A composite electrolyte membrane for a fuel cell which comprises a polybenzimidazole-based polymer and a metal-grafted porous structure and is doped with phosphoric acid, wherein the metal-grafted porous structure is present in an amount of 0.1 to 30% by weight, based on the weight of the polymer, and wherein the metal-grafted porous structure is Al-MCM-41.

2. The composite electrolyte membrane according to claim 1, wherein the polybenzimidazole-based polymer is selected from the group consisting of polybenzimidazole (PBI), poly(2,5-benzimidazole) (2,5-PBI), poly(2,6-benzimidazole) (2,6-PBI), and ABPBI.

3. The composite electrolyte membrane according to claim 1, wherein the metal is selected from the group consisting of aluminum, copper, iron, nickel, and combinations thereof.

4. A method for producing a composite electrolyte membrane for a fuel cell, comprising
   forming a metal-grafted porous structure,
   mixing the metal-grafted porous structure with a solution of a polybenzimidazole-based polymer to form a composite membrane, and
   doping the composite membrane with phosphoric acid to impart ionic conductivity thereto,
   wherein the metal-grafted porous structure is Al-MCM-41.

5. The method according to claim 4, wherein the formation of the metal-grafted porous structure comprises: adding a metal chloride to an aqueous solution of an alkyltrimethylammonium halide; adding aqueous ammonia to the mixture, followed by stirring; dropwise adding tetraethyl orthosilicate to the resulting mixture, followed by stirring; and washing the reaction mixture, followed by drying and calcination to obtain a powder.

6. The method according to claim 5, wherein the alkyltrimethylammonium halide is selected from the group consisting of hexadecyltrimethylammonium bromide, dedecyltrimethylammonium bromide, tetradecyltrimethylammonium bromide, octadecyltrimethylammonium bromide, cetyltrimethylammonium chloride, myristyltrimethylammonium chloride, decyltrimethylammonium bromide, octyltrimethylammonium bromide, hexyltrimethylammonium bromide, and mixtures thereof.

7. The method according to claim 4, wherein the polybenzimidazole-based polymer is selected from the group consisting of polybenzimidazole (PBI), poly(2,5-benzimidazole) (2,5-PBI), poly(2,6-benzimidazole) (2,6-PBI), and ABPBI.

8. The method according to claim 4, wherein the metal is selected from the group consisting of aluminum, copper, iron, nickel, and combinations thereof.

9. The method according to claim 5, wherein the metal chloride is added in an amount such that the metal ions are present at a level of 1 to 30 mole % relative to the total moles of the solution.

10. The method according to claim 4, wherein the metal-grafted porous structure is present in an amount of 0.1 to 30% by weight relative to the weight of the polybenzimidazole-based polymer.

11. The method according to claim 5, wherein the calcination is carried out at a temperature in the range of 300 to 800° C.

12. A fuel cell employing the composite electrolyte membrane according to any one of claims 1 to 3.

* * * * *